(12) United States Patent
Wende

(10) Patent No.: US 7,862,957 B2
(45) Date of Patent: Jan. 4, 2011

(54) CURRENT COLLECTOR PLATES OF BULK-SOLIDIFYING AMORPHOUS ALLOYS

(75) Inventor: Trevor Wende, Boston, MA (US)

(73) Assignee: Apple Inc., Cupertino, CA (US)

( * ) Notice: Subject to any disclaimer, the term of this patent is extended or adjusted under 35 U.S.C. 154(b) by 1071 days.

(21) Appl. No.: 10/548,979

(22) PCT Filed: Mar. 18, 2004

(86) PCT No.: PCT/US2004/008685

§ 371 (c)(1), (2), (4) Date: Jul. 20, 2006

(87) PCT Pub. No.: WO2004/083472

PCT Pub. Date: Sep. 30, 2004

(65) Prior Publication Data

US 2007/0003812 A1    Jan. 4, 2007

(51) Int. Cl.
*H01M 8/02* (2006.01)

(52) U.S. Cl. ........................ 429/522; 429/517; 429/518; 429/519

(58) Field of Classification Search ............... 429/38, 429/517–519, 522; 428/573; 72/364, 370.21
See application file for complete search history.

(56) References Cited

U.S. PATENT DOCUMENTS

| | | | |
|---|---|---|---|
| 3,989,517 A | 11/1976 | Tanner et al. |
| 4,050,931 A | 9/1977 | Tanner et al. |
| 4,064,757 A | 12/1977 | Hasegawa |
| 4,067,732 A | 1/1978 | Ray |
| 4,113,478 A | 9/1978 | Tanner et al. |
| 4,116,682 A | 9/1978 | Polk et al. |
| 4,116,687 A | 9/1978 | Hasegawa |
| 4,126,449 A | 11/1978 | Tanner et al. |
| 4,135,924 A | 1/1979 | Tanner et al. |
| 4,148,669 A | 4/1979 | Tanner et al. |
| 4,157,327 A | 6/1979 | Martin et al. |
| 4,478,918 A | 10/1984 | Ueno et al. |
| 4,623,387 A | 11/1986 | Masumoto et al. |
| 4,648,609 A | 3/1987 | Deike |
| 4,721,154 A | 1/1988 | Christ et al. |
| 4,743,513 A | 5/1988 | Scruggs |

(Continued)

FOREIGN PATENT DOCUMENTS

JP    359013056 A    1/1984

(Continued)

OTHER PUBLICATIONS

Zhang et al., "Amorphous Zr—Al—TM (TM=Co, Ni, Cu) Alloys with Significant Supercooled Liquid Region of Over 100K", Materials Transactions, JIM, 1991, vol. 32, No. 11, pp. 1005-1010.

(Continued)

*Primary Examiner*—Gregg Cantelmo
(74) *Attorney, Agent, or Firm*—Pillsbury Winthrop Shaw Pittman LLP

(57) ABSTRACT

Collector plates made of bulk-solidifying amorphous alloys, the bulk-solidifying amorphous alloys providing ruggedness, lightweight structure, excellent resistance to chemical and environmental effects, and low-cost manufacturing, and methods of making such collector plates from such bulk-solidifying amorphous alloys are provided.

14 Claims, 2 Drawing Sheets

U.S. PATENT DOCUMENTS

| | | | |
|---|---|---|---|
| 4,809,768 A * | 3/1989 | Sato et al. .................. 164/423 | |
| 4,976,417 A | 12/1990 | Smith | |
| 4,978,590 A | 12/1990 | Granata, Jr. et al. | |
| 4,987,033 A | 1/1991 | Abkowitz et al. | |
| 4,990,198 A | 2/1991 | Masumoto et al. | |
| 5,032,196 A | 7/1991 | Masumoto et al. | |
| 5,053,084 A | 10/1991 | Masumoto et al. | |
| 5,053,085 A | 10/1991 | Masumoto et al. | |
| 5,213,148 A | 5/1993 | Masumoto et al. | |
| 5,250,124 A | 10/1993 | Yamaguchi et al. | |
| 5,279,349 A | 1/1994 | Horimura | |
| 5,288,344 A | 2/1994 | Peker et al. | |
| 5,302,471 A | 4/1994 | Ito et al. | |
| 5,324,368 A | 6/1994 | Masumoto et al. | |
| 5,368,659 A | 11/1994 | Peker et al. | |
| 5,380,375 A | 1/1995 | Hashimoto et al. | |
| 5,384,203 A | 1/1995 | Apfel | |
| 5,449,425 A | 9/1995 | Renard et al. | |
| 5,482,580 A | 1/1996 | Scruggs et al. | |
| 5,567,251 A | 10/1996 | Peker et al. | |
| 5,634,989 A | 6/1997 | Hashimoto et al. | |
| 5,711,363 A | 1/1998 | Scruggs et al. | |
| 5,797,443 A | 8/1998 | Lin et al. | |
| 5,886,254 A | 3/1999 | Chi | |
| 5,950,704 A | 9/1999 | Johnson et al. | |
| 6,021,840 A | 2/2000 | Colvin | |
| 6,027,586 A | 2/2000 | Masumoto et al. | |
| 6,044,893 A | 4/2000 | Taniguchi et al. | |
| 6,200,685 B1 | 3/2001 | Davidson | |
| 6,203,936 B1 | 3/2001 | Cisar et al. | |
| 6,258,183 B1 | 7/2001 | Onuki et al. | |
| 6,306,228 B1 | 10/2001 | Inoue et al. | |
| 6,371,195 B1 | 4/2002 | Onuki et al. | |
| 6,376,091 B1 | 4/2002 | Croopnick | |
| 6,408,734 B1 | 6/2002 | Cohen | |
| 6,446,558 B1 | 9/2002 | Peker et al. | |
| 2001/0052406 A1 | 12/2001 | Kubota et al. | |
| 2002/0036034 A1 | 3/2002 | Xing et al. | |
| 2002/0050310 A1 | 5/2002 | Kundig et al. | |
| 2002/0187379 A1 | 12/2002 | Yasuo et al. | |

FOREIGN PATENT DOCUMENTS

| | | |
|---|---|---|
| JP | 06-264200 | 9/1994 |
| JP | 2000-256811 | 9/2000 |
| JP | 02000277127 A | 10/2000 |
| JP | 02001303218 A | 10/2001 |

OTHER PUBLICATIONS

Inoue et al., "Zr—Al—Ni Amorphous Alloys with High Glass Transition Temperature and Significant Supercooled Liquid Region", Materials Transactions, JIM, 1990, vol. 31, No. 3, pp. 177-183.

Tanner et al., "Physical Properties of $Ti_{50}Be_{40}Zr_{10}$ Glass", Scripta Metallurgica, 1977, vol. 11, 5 pgs.

Tanner, L.E., "Physical Properties of Ti—Be—Si Glass Ribbons", Scripta Metallurgica, 1978, vol. 12, pp. 703-708.

Hasegawa et al., "Superconducting Properties of Be—Zr Glassy Alloys Obtained by Liquid Quenching", May 9, 1977, pp. 3925-3928.

Tanner, L.E., "The Stable and Metastable Phase Relations in the Hf—Be Alloy System", Metallurgica, vol. 28, 1980, pp. 1805-1815.

Maret et al., "Structural Study of $Be_{43}Hf_xZr_{57-x}$ Metallic Glasses by X-Ray and Neutron Diffraction", J. Physique, 1986, vol. 47, pp. 863-871.

Jost et al., "The Structure of Amorphous Be—Ti—Zr Alloys", Zeitschrift fur Physikalische Chemie Neue Folge, Bd. 157, 1988, pp. 11-15.

Tanner et al., "Metallic Glass Formation and Properties in Zr and Ti Alloyed with Be—I The Binary Zr—Be and Ti—Be Systems", Acta Metallurgica, 1979, vol. 27, pp. 1727-1747.

* cited by examiner

CURRENT COLLECTOR PLATES OF BULK-SOLIDIFYING AMORPHOUS ALLOYS

FIELD OF THE INVENTION

The present invention relates to current collector plates made of bulk-solidifying amorphous alloys, and methods of making such current collector plates from bulk-solidifying amorphous alloys.

BACKGROUND OF THE INVENTION

A fuel cell is a device used to generate electricity by the chemical reaction of hydrogen gas or other suitable hydrocarbons. A fuel cell generally consists of an electrolyte sandwiched between two electrodes. During operation, hydrogen or other forms of fuel passes over one electrode (the anode), and oxygen or air passes over the other electrode (the cathode) to produce electricity and water and heat as the byproducts. At a molecular level a catalyst at the anode splits an impinging fuel into a positively charged ion and an electron, each of which take different paths to the cathode. When the fuel is hydrogen, the hydrogen atom splits into a proton and an electron. The protons pass through the electrolyte to the cathode, while the electrons are collected to form a current that can be utilized, as electrical power, before they return to the cathode via an external means. At the cathode the protons, electrons, and oxygen are combined, with the aid of a catalyst, to form water. Heat and water are the only byproducts of this chemical process that need to be removed from the fuel cell.

Common types of fuel cell are: Phosphoric Acid Fuel Cells (PAFC), Molten Carbonate Fuel Cells (MCFC), Alkaline Fuel Cells (AFC), Proton Exchange Membrane Fuel Cells (PEMFC), Direct Methanol Fuel Cell (DMFC) and Solid Oxide Fuel Cells (SOFC). Fuel cells may operate at lower temperatures (about 250° C. or less), or at higher temperatures (about 500° C. or greater) depending on their specific type. Lower operating temperature fuel cells include PAFC, AFC, and PEMFC.

Although generally each individual unit fuel cell comprises a membrane (electrolyte) assembly and catalysts interposed between electrically conductive current collector plates, in actual operation mode, multiple unit cells are arranged in series to form a fuel cell stack to meet voltage and/or power requirements. When the individual cells are arranged in series to form a fuel cell stack, the current collector plates are generally referred to as bipolar collector plates, flow-field plates or collector-separator plates. In such an arrangement, the bipolar plate is generally a single plate with one side acting as the cathode and the other side acting as the anode, where each side acts separately as a collector plate (as a cathode or anode) of two neighboring units. In some cases, the bipolar plate can be thought of as comprising different components including a separator plate, which is sandwiched between the cathode and the anode side belonging to the neighboring unit cells. In such a device the separator plates acts as a boundary from one cell to the next cell. There are different variations of the collector plates. For example, the current collector acting as the cathode or anode can be a single plate. Another example is that the current collector, acting as the cathode or anode, and the separator can be a single plate. For simplicity, such plates will be called the collector plates in this invention, which can be the current transferor, separator, cathode, anode, end plate, or any combination thereof.

Regardless of the ultimate form of the collector plates, such plates perform multiple functions that are critical for the entire operation of the fuel cell. First, the collector plates provide a structural support and electrical connection between unit cells. In the case of a single unit fuel cell, the collector plate (which is also the end plate) is connected electrically to an electrical load. Second, the collector plates direct and distribute fuel, and/or oxidant reactants, and/or coolant to, away from, and within unit cells. Third, the collector plates remove products from unit cells and separate fuel and oxidant gas streams between electrically connected cells. In addition to being electrically conductive, collector plates must have good mechanical strength, high resistance to degradation caused by chemical attack and/or hydrolysis, and low permeability to hydrogen gas.

Typically, collector plates have intricate functional patterns formed on the majority of its surface area. For example, complex channels with different patterns, sizes, and shapes, are needed for directing fuel, oxidant, coolant, and byproducts through the fuel cell. The design of the complex patterns depends greatly on the desired pressure drop, resident time, and flow rate. A single channel design would increase pressure drop and resident time, but decrease the flow rate. A multiple channel design would decrease the pressure drop and resident time, but increase the flow rate. The typical dimensions, the depth, and the width of such surface features are on the order of 1 mm, although these features can be substantially smaller than 1.0 mm or substantially larger than 1.0 for special fuel cells. However, such surface intricacies cause significant manufacturing problems for materials commonly used for collector plates.

For example, graphite structures have been traditionally machined to a desired configuration from graphite composite blanks, which is very expensive and time consuming due to the nature of such machining. Although polymer based materials have some advantage with regard to the ease of manufacturing, the collector plates made of polymer based materials are typically inadequate due to the poor electrical conductivity and low strength of the material, particularly with regard to withstanding the compression force necessary to hold multiple fuel cell unit together in stacking applications. Conventional metals and alloys have also been used in fuel cell, but all suffer significant deficiencies. For example, using machined ordinary alloys to produce the necessary detailed surface features has proved to be very expensive. Furthermore, although the lower cost ordinary alloys may be coated with a corrosion resistance layer, which may temporarily solve corrosion problems, such coatings do not represent a satisfactory solution for the long-term stability of the fuel cell structure.

Other issues also arise in the use of ordinary alloys. For example, collector plates should have a high tolerance in the flatness and surface finish of the plate in order to provide an effective seal for the transport of the fuel and byproducts in the gas and liquid form. Any leakage of these gas and liquids, especially in stacked units is not acceptable, and is a critical factor in determining the long-term stability of the fuel cell. For example, typical alloys are readily prone to permanent deformation, such as nicking and denting during fabrication and assembly, whereas graphite plates are extremely fragile without showing any flexibility. Considering the large surface area, high flatness, and small thickness needed in most collector plate applications, the problems of permanent bending and denting for metallic alloys, and the fragility of graphite base materials become severe deficiencies in producing satisfactorily performing collector plates.

Accordingly, a need exists for improved materials for collector plates and collector plates made of such materials.

SUMMARY OF THE INVENTION

The present invention is directed to a collector plate made of a bulk solidifying amorphous alloy.

In another embodiment of the invention, the collector plate is part of a fuel cell assembly. In yet another embodiment of the invention, the collector plate is at least in part of another plate or fuel cell material.

In still another embodiment of the invention, the collector plate also functions as a tight seal to prevent liquid and gaseous permeation.

In still yet another embodiment of the invention, the collector plate comprises a cathode facing face and an anode facing face with multiple channels for transporting fuels, reactants, and products.

In still yet another embodiment of the invention, the collector plate may have multiple channels between the cathode facing face and the anode facing face for heat exchanging purpose.

In still yet another embodiment of the invention, the collector plate comprises two plates, a cathode facing plate and an anode facing plate with multiple channels for transporting fuels, reactants, and products. In such an embodiment, the interfacial surface of the cathode and the anode plate of the adjacent fuel cell unit may comprise multiple channels for heat exchanging purposes.

In still yet another embodiment of the invention, a gas impervious layer may be place between the cathode and the anode plate to prevent gas cross-over from one plate to another.

In still yet another embodiment of the invention, the surface features of collector plate has the aspect ratio (depth/width) from 0.1 to 5.

In still yet another embodiment of the invention, the width of the channels in the collector plate is between 100 (micrometer) to 2000 (micrometer).

In still yet another embodiment of the invention, the collector plate is made of bulk-solidifying amorphous alloy with an elastic strain limit of about 1.8% or more.

In still yet another embodiment of the invention, the amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" in the range of from 0 to 50 in atomic percentages In still yet another embodiment of the invention, the amorphous alloy is described by the following molecular formula: $(Zr, Ti)_a(Ni, Cu)_b(Be)_c$, wherein "a" is in the range of from 40 to 75, "b" is in the range of from 5 to 50, and "c" in the range of from 5 to 50 in atomic percentages.

In still yet another embodiment of the invention, the amorphous alloy can sustain strains up to 1.5% or more without any permanent deformation or breakage.

In still yet another embodiment of the invention, the bulk solidifying amorphous alloy has a high fracture toughness of at least 20 ksi-in$^{0.5}$.

In still yet another embodiment of the invention, the bulk solidifying amorphous alloy has a ΔT of 60° C. or greater.

In still yet another embodiment of the invention, the bulk solidifying amorphous alloy is a ferrous based metals wherein the elastic limit of the amorphous alloy is about 1.2% and higher, and the hardness of the amorphous alloys is about 7.5 Gpa and higher.

In another alternative embodiment, the invention is also directed to methods of manufacturing collector plates from bulk-solidifying amorphous alloys.

BRIEF DESCRIPTION OF THE DRAWINGS

These and other features and advantages of the present invention will be better understood by reference to the following detailed description when considered in conjunction with the accompanying drawings wherein.

DESCRIPTION OF THE INVENTION

The current invention is directed to collector plates made of bulk-solidifying amorphous alloys, the bulk-solidifying amorphous alloys providing ruggedness, lightweight structure, excellent resistance to chemical and environmental effects, and low-cost manufacturing. Another object of the current invention is a method of making collector plates from such bulk-solidifying amorphous alloys.

Figure 1A:
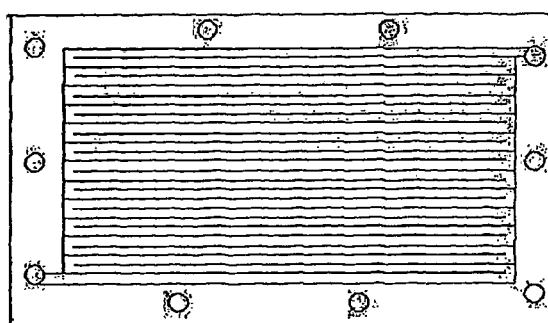
FIG. 1a is a schematic of an exemplary embodiment of a collector plate in accordance with the present invention.
Figure 1B:
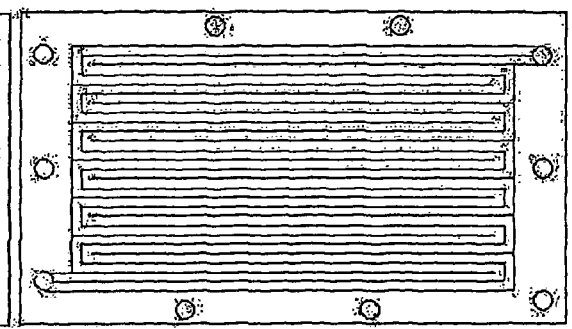
FIG. 1b is a schematic of another exemplary embodiment of a collector plate in accordance with the present invention.

FIGS. 1a and 1b are schematic diagrams of typical collector plates made of bulk solidifying amorphous alloy with intricate flow channel patterns. As can be observed from the Figures, the actual design of the intricate flow channels may take any form and is only depent on the desired pressure drop, reaction duration, and optimal flow rate. For example, FIG. 1a shows a single channel design for the transportation of materials, while FIG. 1b shows a and double channel design.

Bulk solidifying amorphous alloys are a recently discovered family of amorphous alloys, which can be cooled at substantially lower cooling rates, of about 500 K/sec or less, and substantially retain their amorphous atomic structure. As such, they can be produced in thicknesses of 1.0 mm or more, substantially thicker than conventional amorphous alloys, which are typically limited to thicknesses of 0.020 mm, and which require cooling rates of $10^5$ K/sec or more. U.S. Pat. Nos. 5,288,344; 5,368,659; 5,618,359; and 5,735,975, the disclosures of which are incorporated herein by reference in their entirety, disclose such bulk solidifying amorphous alloys.

A family of bulk solidifying amorphous alloys can be described as $(Zr, Ti)_a(Ni, Cu, Fe)_b(Be, Al, Si, B)_c$, where a is in the range of from 30 to 75, b is in the range of from 5 to 60, and c in the range of from 0 to 50 in atomic percentages. Furthermore, these basic alloys can accommodate substantial amounts (up to 20% atomic, and more) of other transition metals, such as Nb, Cr, V, Co. A preferable alloy family is $(Zr, Ti)_a(Ni, Cu)_b(3e)_c$, where a is in the range of from 40 to 75, b is in the range of from 5 to 50, and c in the range of from 5 to 50 in atomic percentages. Still, a more preferable composition is $(Zr, Ti)_a(Ni, Cu)_b(3e)_c$, where a is in the range of from 45 to 65, b is in the range of from 7.5 to 35, and c in the range of from 10 to 37.5 in atomic percentages. Another preferable alloy family is $(Zr)_a(Nb, Ti)_b(Ni, Cu)_c(Al)_d$, where a is in the range of from 45 to 65, b is in the range of from 0 to 10, c is in the range of from 20 to 40 and d in the range of from 7.5 to 15 in atomic percentages.

Another set of bulk-solidifying amorphous alloys are ferrous metals (Fe, Ni, Co) based compositions. Examples of such compositions are disclosed in U.S. Pat. No. 6,325,868 and in publications to (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. # 2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not processable to the degree of the Zr-base alloy systems, they can still be processed in thicknesses of 1.0 mm or more, sufficient enough to be utilized in the current invention.

Bulk-solidifying amorphous alloys have typically high strength and high hardness. For example, Zr and Ti-base amorphous alloys typically have yield strengths of 250 ksi or higher and hardness values of 450 Vickers or higher. The ferrous-base version of these alloys can have yield strengths up to 500 ksi or higher and hardness values of 1000 Vickers and higher. As such, these alloys display excellent strength-to-weight ratio especially in the case of Ti-base and Fe-base alloys. Furthermore, bulk-solidifying amorphous alloys have good corrosion resistance and environmental durability, especially the Zr and Ti based alloys. Amorphous alloys generally have high elastic strain limit approaching up to 2.0%, much higher than any other metallic alloy.

In general, crystalline precipitates in bulk amorphous alloys are highly detrimental to the properties of amorphous alloys, especially to the toughness and strength of these alloys, and as such it is generally preferred to minimize the volume fraction of these precipitates. However, there are cases in which, ductile crystalline phases precipitate in-situ during the processing of bulk amorphous alloys, which are indeed beneficial to the properties of bulk amorphous alloys, especially to the toughness and ductility of the alloys. Such bulk amorphous alloys comprising such beneficial precipitates are also included in the current invention. One exemplary case is disclosed in (C. C. Hays et. al, Physical Review Letters, Vol. 84, p 2901, 2000), which is incorporated herein by reference.

As a result of the use of these bulk-solidifying amorphous alloys, the collector plates of the present invention have characteristics that are much improved over conventional collector plates made of ordinary metallic materials. The surprising and novel advantages of using bulk-solidifying amorphous alloys in producing collector plates will be described in various embodiments below.

First, the combination of high strength and high strength-to-weight ratio of the bulk solidifying amorphous alloys significantly reduces the overall weight and bulkiness of the collector plates of the current invention, thereby allowing for the reduction of the thickness of these collector plates without jeopardizing the structural integrity and operation of the fuel cells into which these collector plates are integrated. The ability to fabricate collector plates with thinner walls is also important in reducing the bulkiness of the fuel cell and increasing the efficiency per -volume of the fuel cell. The efficiency of the fuel cell also increases because of higher allowable flow rates and the fact that there more of the surface of the catalyst is used. This increased efficiency is particularly useful for the application of fuel cells in mobile devices and equipment, such as in automobiles and the like because the less bulky the fuel cell, the easier it is to provide storage for the device on such a mobile device.

Although other high strength and high strength-to-weight ratio materials might be considered in the use of collector plates, there are major fabrication and assembly deficiencies with most such materials. For example, one material with high strength and excellent strength-to-weight ratio is graphite, however, graphite lacks any flexibility and is therefore actually quite fragile. Another example would be conventional metallic alloys, however, most conventional metallic alloys are prone to permanent deformation and denting. The very large surface area and very small thicknesses of collector plates makes such problems even more significant. However, bulk-solidifying amorphous alloys have reasonable fracture toughness, on the order of 20 ksi-sqrt(in), and high elastic strain limit, approaching 2%. Accordingly, high flexibility can be achieved without permanent deformation and denting of the collector plate. As such, collector plates made of bulk-solidifying amorphous alloys can be readily handled during fabrication and assembly, reducing the cost and increasing the performance of the fuel cell.

As discussed, bulk solidifying amorphous alloys have very high elastic strain limits, typically around 1.8% or higher. This is an important characteristic for the use and application of fuel cell collector plates. Specifically, high elastic strain limits are preferred for devices mounted in mobile devices, or in other applications subject to mechanical loading or vibration. A high elastic strain limit allows the collector plate to take even more intricate shape and to be thinner and lighter. High elastic strain limits also allow the collector plates to sustain loading and flexing without permanent deformation or destruction of the device.

Furthermore, high strength, high hardness and high elastic strain limit characteristics of bulk amorphous alloys provide better performance and durability for the seal joints of the collector plates providing longer lifetime and lower maintenance. The combination of a strength higher than 200 ksi, a hardness more than 400 Vickers, and an elastic strain limit higher than 1.5% of bulk amorphous alloys provides durability not only for the seal joints, but also for the whole collector plate in general during handling, assembly and service.

Bulk amorphous alloys have reasonably good electrical conductivity, about 5000 S/cm in the case Zr/Ti base alloys, and this relatively high electrical conductivity can improve the efficiency of the fuel cell when compared to composite plastic materials that have an average electrical conductivity of only a few hundred S/cm.

In addition to being electrically conductive, collector plates made of bulk solidifying amorphous alloy also have good corrosion resistance, high inertness, and low permeability to hydrogen gas. The high corrosion resistance and inertness of these materials are useful for preventing the collector plates from being decayed by undesired chemical reactions between the collector plate and the mobile phases of the fuel cell. The inertness of bulk solidifying amorphous alloy is also very important to the life of the fuel cell because it doesn't tend to poison the catalyst or react with the fuel and other chemicals in the fuel cell.

Another aspect of the invention is the ability to make collector plates with isotropic characteristics. Generally non-isotropy in metallic articles causes degraded performance for those portions of metallic articles that require precision fit, such as in the seals, intricate channels, and contact surfaces of the formed collector plates due to variations in temperature, mechanical forces, and vibration experienced across the article. Moreover, the non-uniform response of the bipolar plates in various directions would also require extensive design margins to compensate, and as such would result in heavy and bulky structures. Accordingly, the isotropic response of the collector plates in accordance with the present invention is crucial, at least in certain designs, given the intricate and complex patterns and the associated large surface areas and very small thicknesses of the collector plates, as well as the need to utilize high strength construction material. Providing such intricate channels in such large surface area and small thickness plates from ordinary alloys will be difficult due to the polycrystalline grainy structure of such alloys. For example, the castings of ordinary alloys are typically poor in mechanical strength and are distorted in the case of large surface area and very small thickness. Accordingly, using metallic alloys for casting such large surface areas with high tolerance in flatness is not generally feasible. In addition, for the ordinary metallic alloys, extensive rolling operations would be needed to produce the collector plate sheet in the desired flatness and with the desired high strength. However, in this case the rolled products of ordinary high-strength alloys generate strong orientation, and as such lack the desirable isotropic properties. Indeed, such rolling operations typically result in highly oriented and elongated crystalline grain structures in metallic alloys resulting in highly non-isotropic material. In contrast, bulk-solidifying amorphous alloys, due to their unique atomic structure lack any microstructure as observed in crystalline and grainy metal, and as a result articles formed from such alloys are inherently isotropic.

Another function of the collector plate is to provide structural rigidity and complex patterns of pathways for fuel, oxidant reactants, coolant, and products, and suitable seals to contain them. By having complex patterns, the desired flow rate, pressure drop, and resident time can be achieved easily. The high strength, high elastic strain limit and high surface finishes of the bulk amorphous alloys allow for the ready production of collector plates with seals of relatively high integrity utilizing various gaskets including metallic ones.

Another object of the invention is providing a method to produce collector plates in net-shape form from bulk solidifying amorphous alloys. By producing collector plates in net-shape form manufacturing costs can be significantly reduced while still forming collector plates with good flatness, intricate surface features comprising complex channels, and high surface finish on the sealing areas.

Figure 2:
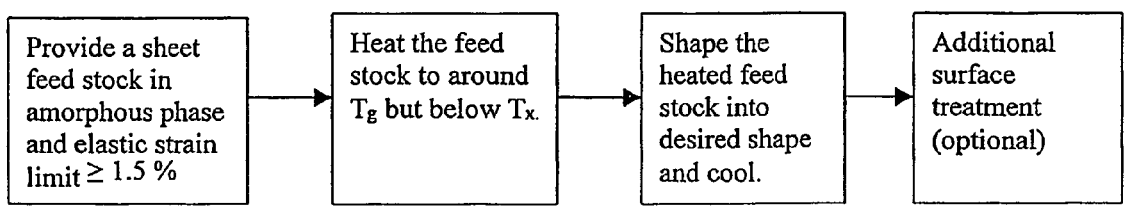
FIG. 2 is a flowchart of an exemplary method of manufacturing a collector plate in accordance with the present invention.

One exemplary method of making such collector plates, as shown in the flowchart provided in FIG. 2, comprises the following steps:
1) Providing a sheet feedstock of amorphous alloy being substantially amorphous, and having an elastic strain limit of about 1.5% or greater and having a $\Delta T$ of 30° C. or greater;
2) Heating the feedstock to around the glass transition temperature;
3) Shaping the heated feedstock into the desired shape; and
4) Cooling the formed sheet to temperatures far below the glass transition temperature.

Herein, $\Delta T$ is given by the difference between the onset of crystallization temperature, $T_x$, and the onset of glass transition temperature, $T_g$, as determined from standard DSC (Differential Scanning Calorimetry) measurements at typical heating rates (e.g. 20° C./min).

Preferably $\Delta T$ of the provided amorphous alloy is greater than 60° C., and most preferably greater than 90° C. The provided sheet feedstock has preferably about the same thickness as the average thickness of the final collector plate. Moreover, the time and temperature of the heating and shaping operation is selected such that the elastic strain limit of the amorphous alloy is substantially preserved to be not less than 1.0%, and preferably not being less than 1.5%. In the context of the invention, temperatures around glass transition means the forming temperatures can be below glass transition, at or around glass transition, and above glass transition temperature, but always at temperatures below the crystallization temperature $T_x$. The cooling step is carried out at rates similar to the heating rates at the heating step, and preferably at rates greater than the heating rates at the heating step. The cooling step is also achieved preferably while the forming and shaping loads are still maintained.

Upon the finishing of the above-mentioned fabrication method, the shaped collector plate can be subjected further surface treatment operations as desired such as to remove any oxides on the surface. Chemical etching (with or without masks) can be utilized as well as light buffing and polishing operations to provide improvements in surface finish so that high quality sealing and surface matching with other components can be achieved.

Another exemplary method of making collector plates in accordance with the present invention comprises the following steps:
1) Providing a homogeneous alloy feedstock of amorphous alloy (not necessarily amorphous);
2) Heating the feedstock to a casting temperature above the melting temperatures;
3) Introducing the molten alloy into shape-forming mold; and
4) Quenching the molten alloy to temperatures below glass transition.

Bulk amorphous alloys retain their fluidity from above the melting temperature down to the glass transition temperature due to the lack of a first order phase transition. This is in direct contrast to conventional metals and alloys. Since, bulk amorphous alloys retain their fluidity, they do not accumulate significant stress from their casting temperatures down to below the glass transition temperature and as such dimensional distortions from thermal stress gradients can be minimized. Accordingly, collector plates with large surface area and small thickness can be produced cost-effectively.

The above mentioned net-shape forming methods provide low cost collector plates with functional surface features with intricate details (e.g. flow channels) at the order of 1.0 mm and preferably at much less than 1.0 mm. Furthermore, these surface features can be achieved at high tolerances of flatness over large surface areas (e.g. 24"×24" or larger) and small thickness and cross-sections (e.g. 1.0 mm or less). The advantages of bulk amorphous alloys and the above mentioned methods becomes increasingly crucial when these functional surface features (e.g. flow channels and seal joints) cover more than 20% of the overall plate area and preferably more than 50% of the overall plate area. When these surface features cover more than 80% of the overall plate area, the economics of manufacturing these surface features can be the most dominant factor and the advantages of bulk solidifying amorphous alloys and the methods described in this invention become more crucial.

Although specific embodiments are disclosed herein, it is expected that persons skilled in the art can and will design alternative amorphous alloy collector plates and methods to produce the amorphous alloy collector plates that are within the scope of the following claims either literally or under the Doctrine of Equivalents.

What is claimed is:

1. A collector plate comprising a conductive body having a cathode collecting face and an anode collecting face, and having each face of said plate having a functional surface, each of said functional surface including a plurality of functional surface features formed thereon, said functional surface features covering at least 50% of the functional surface and including at least one channel for transporting reaction materials between said cathode and anode collecting face, wherein the functional surface features have a size scale of less than 1.0 mm and the functional surface of the collector plate has a cross-section and thickness of less than 1.0 mm, and wherein at least the functional surface of said collector plate is constructed entirely of an isotropic bulk solidifying amorphous alloy having an elastic strain limit of at least 1.5%.

2. The collector plate of claim 1, further comprising multiple heat exchange channels between the cathode collecting face and the anode collecting face.

3. The collector plate of claim 1, wherein the surface features of the collector plate have an aspect ratio (depth/width) of from 0.1 to 5.

4. The collector plate of claim 1, wherein the functional surface covers more than 80% of the overall collector plate area.

5. The collector plate of claim 1, wherein the width of the at least one channel is less than about 100 μm.

6. The collector plate of claim 1, wherein the bulk-solidifying amorphous alloy has an elastic strain limit of about 1.8% or more.

7. The collector plate of claim 1, wherein the bulk solidifying amorphous alloy is described by the molecular formula: $(Zr, Ti)_a(Ni, Cu, Fe)_b(Be, Al, Si, B)_c$, wherein "a" is in the range of from 30 to 75, "b" is in the range of from 5 to 60, and "c" in the range of from 0 to 50 in atomic percentages.

8. The collector plate of claim 1, wherein the bulk solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" in the range of from 5 to 50 in atomic percentages.

9. The collector plate of claim 1, wherein the bulk solidifying amorphous alloy has a high fracture toughness of at least 20 ksi-in$^{0.5}$.

10. The collector plate of claim 1, wherein the bulk solidifying amorphous alloy has a ΔT of 60° C. or greater.

11. The collector plate of claim 1, wherein the bulk solidifying amorphous alloy contains at least a majority of iron.

12. A fuel cell comprising:
a collector plate comprising a conductive body having a cathode collecting face and an anode collecting face, and having each face of said plate having a functional surface, each of said functional surface including a plurality of functional surface features formed thereon, said functional surface features covering at least 50% of the functional surface and including at least one channel for transporting reaction materials between said cathode and anode collecting face, wherein the functional surface features have a size scale of less than 1.0 mm and the functional surface of the collector plate has a cross-section and thickness of less than 1.0 mm, and wherein at least the functional surface of said collector plate is constructed entirely of a isotropic bulk solidifying amorphous alloy;
a cathode disposed adjacent to the cathode collecting face of the conductive body; and
an anode adjacent to the anode collecting face of the conductive body.

13. The fuel cell of claim 12, wherein the collector plate forms a tight seal within the fuel cell to prevent leakage of liquid and gaseous material between the anode and the cathode.

14. The fuel cell of claim 12, wherein the fuel cell further comprised an interfacial surface between the cathode and the anode of the fuel cell unit, wherein said interfacial surface has a plurality of heat exchange channels.

* * * * *